United States Patent [19]

Inoue

[11] 4,405,421

[45] Sep. 20, 1983

[54] METHOD OF AND APPARATUS FOR ELECTROCHEMICALLY GRINDING A CONDUCTIVE WORKPIECE

[75] Inventor: Kiyoshi Inoue, Tokyo, Japan

[73] Assignee: Inoue-Japax Research Incorporated, Yokohama, Japan

[21] Appl. No.: 235,560

[22] Filed: Feb. 18, 1981

[30] Foreign Application Priority Data

Feb. 22, 1980 [JP] Japan .................................. 55-21954
Oct. 8, 1980 [JP] Japan ................................ 55-141518
Oct. 22, 1980 [JP] Japan ................................ 55-148471

[51] Int. Cl.³ .......................... B23P 1/10; B23P 1/12; B23P 1/14
[52] U.S. Cl. ............................ 204/129.2; 204/129.43; 204/129.46; 204/129.5; 204/217; 204/218; 204/225; 204/228; 204/284; 204/293; 204/294
[58] Field of Search .............................. 204/291–292, 204/294, 224 M, 228, 217, 218, 129.46, 129.4, 129.43, 129.2, 284, 225, DIG. 9, 129.5, 293

[56] References Cited

U.S. PATENT DOCUMENTS

| 3,461,056 | 8/1969 | Maeda et al. ................... 204/294 X |
| 4,013,526 | 5/1977 | Inoue ......................... 204/224 M X |
| 4,236,985 | 12/1980 | Grodzinsky et al. .... 204/DIG. 9 X |

FOREIGN PATENT DOCUMENTS

| 765101 | 1/1957 | United Kingdom . |
| 770754 | 3/1957 | United Kingdom . |
| 1135076 | 11/1968 | United Kingdom . |
| 1205468 | 9/1970 | United Kingdom . |
| 1227793 | 4/1971 | United Kingdom . |

Primary Examiner—Donald R. Valentine
Attorney, Agent, or Firm—Karl F. Ross; Herbert Dubno

[57] ABSTRACT

An improved electrochemical grinding wheel electrode consisting essentially of electrically conductive abrasive grains bonded together with an essentially nonconductive bonding matrix. The abrasive grains are admixed with an amount of 10 to 30% by volume of the bonding matrix and sintered together to form the porous, homogeneous electrode body, e.g. in the form of a wheel, having a specific resistivity not greater than 100 ohm-cm, preferably between 0.1 and 10 ohm-cm.

29 Claims, 3 Drawing Figures

METHOD OF AND APPARATUS FOR ELECTROCHEMICALLY GRINDING A CONDUCTIVE WORKPIECE

FIELD OF THE INVENTION

The present invention relates generally to the art of electrochemical grinding (ECG), also called electrolytic grinding (ELG). More particularly, the invention relates to an improved electrochemical grinding electrode body, e.g. a wheel, as well as to an improved method of and apparatus for the electrochemical grinding of an electrically conductive workpiece using a rotating wheel electrode constituted by such an improved electrode body.

BACKGROUND OF THE INVENTION

Electrochemical grinding is a machining process in which two distinct machining actions, in combination, are simultaneously exerted upon an electrically conductive workpiece: the electrolytic dissolution of material from the conductive workpiece produced when a high-density electric current is passed between the workpiece and a tool electrode through an electrolyte that serves as an electrochemical machining medium; and the mechanical abrading of the tool surface against the workpiece. In a finishing operation subsequent to the machining process, only the mechanical action may be utilized using the same tool to give the machined body a shining finish. It is desired therefore that the tool be an electrode body having both good electrical conducting and satisfactory abrading capabilities.

Electrode bodies conventionally used for electrochemically grinding an electrically conductive workpiece consist of a structure of portions functionally divided from one another as regards the conductivity and abrasivity. Thus, typical electrochemical grinding tool electrodes are metal bonded diamond or other abrasive wheels which consist of electrically nonconductive abrasive particles constituting mechanical tools that are supported on and in a metal matrix providing the path for the electrochemical machining current. These bodies are, however, not of sufficient bond strength. Abrasive particles tend to dislodge rather quickly from the metal matrix and therefore the tool body as a whole undergoes considerable wear in the course of a machining operation. In addition, they are comparatively expensive to manufacture and poor in shapability. In another class of conventional electrochemical grinding electrode bodies, a commercially available purely abrasive porous wheel (e.g. vitrified, silicate, rubber, resinoid, shellac or oxychloride bonded abrasive of silicon carbide, boron nitride, boron carbide, aluminum oxide, zirconium oxide, zinc oxide, titanium oxide or diamond) acquires electrical conductivity by having its inner interconnected pores impregnated with conductive materials. The impregnation may be effected with a chemical plating solution so that an electrically conductive coating builds up on the wall portions of the pores by chemical reduction of a metal from the solution. In use of the wheel, the conductive coating provides paths for the electrochemical machining current. The bond between the conductive coating and the abrasive matrix is, however, comparatively poor. Furthermore, the chemically plated coating tends to suffer aging changes and to be oxidized and corroded and the pores tend to be clogged with oxidation and corrosion products in use of the wheel. As a result, the wheel degenerates rather quickly as to both mechanical and electrochemical capabilities.

OBJECTS OF THE INVENTION

It is accordingly an important object of the present invention to provide an improved electrochemical grinding electrode body which is excellent in shapability and superior in electrochemical and mechanical or abrasive capabilities, economical in manufacture and less liable to suffer aging degradation. Another object of the invention is to provide an improved method of electrochemically grinding a conductive workpiece which allows the workpiece to be machined with an increased efficiency and operational stability.

A further object of the invention is to provide an electrochemical grinding apparatus for carrying out the improved method.

SUMMARY OF THE INVENTION

In accordance with the present invention, in a first aspect thereof, there is provided an electrochemical grinding electrode body consisting essentially of electrically conductive abrasive grains bonded together with an essentially electrically nonconductive bonding matrix, the abrasive grains being admixed with an amount, preferably between 10 and 30%, of the bonding matrix and sintered together to form the electrode body having a specific resistivity not greater than 100 ohm-cm. In contradistinction with the earlier belief that the electrical conductivity and the abrasivity should be served by separate media forming an integral structure, e.g. a metal matrix and abrasive particles in a metal-bonded wheel and a nonconductive porous abrasive skeleton and conductive coatings formed on the wall portions of the pores therein in a plated abrasive wheel, it has now been found that grains of an electrically conductive and abrasive material merely bonded together by a bonding material independent of the conductivity may be used to constitute an integrated electrochemical and abrasive medium with the result that all of the requirements are substantially met.

The invention also provides, in a second aspect thereof, a method of electrochemically grinding an electrically conductive workpiece with a rotating wheel constituted by the electrode body, which method comprises: repetitively displacing the workpiece transversely relative to the rotating wheel along a straight path, and in each run of the repetition setting the depth of cut at a value not greater than 5 micrometers. The electrochemical machining current passed between the workpiece and the rotating wheel electrode in each run is preferably in the form of a succession of electrical pulses.

Specifically, the improved method of electrochemical grinding of an electrically conductive workpiece is carried out with a rotating wheel electrode which is preferably but not exclusively constituted by an electrode body defined in the foregoing and makes, in the usual way, use of an electrochemical grinding current, preferably in the form of a succession of pulses, passed through a grinding interface defined between the workpiece and the rotating wheel electrode and flushed with a liquid electrolyte. The method, in accordance with this aspect of the invention, however, comprises: causing the workpiece to traverse the rotating wheel electrode along a predetermined rectilinear path repeatedly over a predetermined number of successive runs; setting, in each of the runs, the depth of cut by the rotating wheel electrode in the workpiece as determined by the position of the workpiece traversing the rotating wheel electrode along the said path to be not greater than 5 micrometers; and repeating such runs so as to complete the successive runs whereby to cumulatively achieve a desired depth of cut in the workpiece.

In an apparatus aspect, the invention also provides an improved apparatus for electrochemically grinding an electrically conductive workpiece with a rotating wheel electrode, the apparatus comprising: a power supply for passing an electrochemical grinding current through a grinding interface defined between the workpiece and the rotating wheel electrode and flushed with a liquid electrolyte; drive means for causing the workpiece to traverse the rotating wheel electrode along a predetermined rectilinear path repeatedly over a predetermined number of successive runs; and positioning means for locating, in each of the successive runs, the position of the workpiece traversing the rotating wheel electrode along the said path so as to set the depth of cut by the rotating wheel electrode in the workpiece to be not greater than 5 micrometers; and control means for permitting the run to be repeated to complete the said predetermined number of the successive runs whereby to cumulatively achieve a desired depth of cut in the workpiece.

BRIEF DESCRIPTION OF DRAWING

These and other objects, features and advantages of the present invention will be more readily appreciated from the following description of certain embodiments thereof. In the accompanying drawing.

SPECIFIC DESCRIPTION

Figure 1:
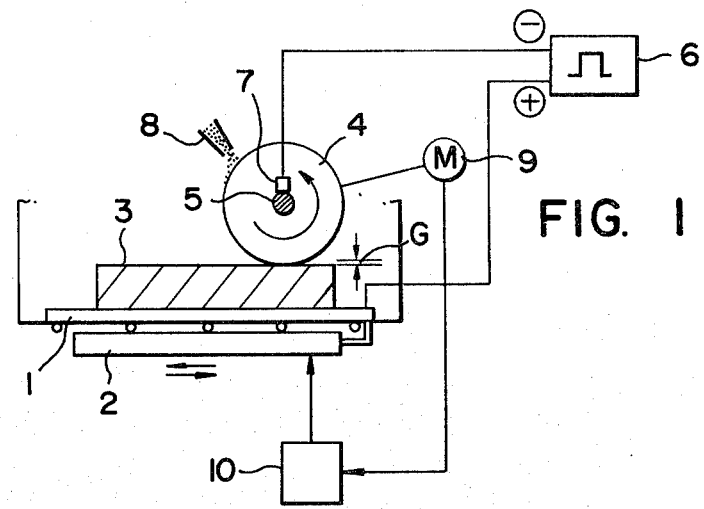
FIG. 1 is a schematic view of an electrochemical grinding arrangement for the explanation of a method of the invention.

The invention provides an improved electrode body for electrochemical grinding, consisting essentially of electrically conductive abrasive grains bonded together by an essentially electrically nonconductive bonding matrix, the abrasive grains being admixed with an amount less than 30%, preferably between 10 and 25% by volume, of the bonding matrix and sintered together to form the electrode body having a specific resistivity not greater than 100 ohm-cm.

The individual electrically conductive abrasive grains may essentially consist of a substrate selected from the group consisting of carbides, nitrides and borides of titanium and hafnium and which may be TiC, $TiB_2$, TiN, HfC, TiBC, TiCN, TiHfC, $(TiB_2)C$, $(TiB2)N$, $TiCB_4C$, $TiNB_4C$, $TiCB_{13}C_2$, $TiNB_{13}C_2$, TiCWC, $B_4CWC$ and/or $B_4CSiC$.

While conventional abrasive materials such as SiC and $Al_2O_3$ forming the abrasive particles in a metal-bonded wheel or the abrasive skelton in a plated electrochemical grinding wheel are of a specific resistivity of $10^{10}$ $\mu\Omega cm$ and hence are essentially nonconductive, such an abrasive material as defined or listed above has a specific resistivity in the order of $\mu\Omega cm$ (for example, TiC 70 to 170 $\mu\Omega cm$) and it has been found that such materials of a low electrical resistivity can be bonded together with a nonconductive binder to provide an excellent electrode body of an overall resistivity not greater than 100 $\Omega cm$, preferably 0.1 to 10 $\Omega cm$. These materials advantageously have also a great hardness and crushing strength, for example, for TiC the crushing strength amounts of 2900 to 3200 $kg/mm^2$ and for $TiB_2$ that strength amounts 3300 to 3450 $kg/mm^2$. A carbide and nitride of $TiB_2$, viz. $(TiB_2)C$ and $(TiB_2)N$ have a similar crushing strength and electrical resistivity and have been found to be examples of highly satisfactory conductive abrasive material.

The conductive abrasive grains may be bonded together with nonconductive abrasive grains such as $B_4C$, CBN (cubic boron nitride) and diamond. Other conductive or semiconductive abrasives such as WC, SiC, ZrC may also be added. Sometimes, it has been found to be suitable to further include a compound or compounds of La, Y, Ce and other rare-earth elements. The bonding matrix may be an inorganic glass material, resin or rubber. The conductive abrasive grains and such a bonding matrix when bonded or sintered together have an extreme high bonding strength. An optimum porosity, bond strength and electrical conductivity of the electrode body is obtained when the amount of the bonding matrix ranges between 10 to 25% by volume.

EXAMPLE I

A mixture of 33% by volume of TiC of a grain size of 140 $\mu\phi$, 20% by volume of TiN of a grain size of 140 $\mu\phi$, 30% by volume of SiC of a grain size of 120 $\mu\phi$ and as a bonding matrix 17% by volume of a frit was sintered with an electrical sintering arrangement by passing an electric current of 3600 amperes through the mixture for a period of 30 minutes under an initial pressure of 10 $kg/cm^2$ for a period of 20 minutes at a temperature of 1300° C. The sintered body was shaped into a wheel of an outer diameter of 100 mm and a thickness of 10 mm. The wheel had a specific resistivity of 0.5 $\Omega cm$ uniform throughout the entire body and was found to be excellent for both electrochemical and mechanical capabilities and to yield, without clogging, an extremely high operational stability. The frit used as the bonding matrix contained, by weight, 3.8 parts of $Na_2O$, 5.8 parts of $K_2O$, 2.5 parts of MgO, 3.5 parts of CaO, 8.6 parts of $B_2O$, 31.5 parts of $Al_2O_3$, 41.9 parts of $SiO_2$, 5.9 parts of PbO, 3.6 parts of feldspar, 19 parts of clay, 17 parts of iron oxide and 26 parts of zinc white.

EXAMPLE II

The wheel prepared in Example I was used for electrochemically grinding a workpiece of WC-6%Co with an electrolyte consisting of an aqueous solution of 15% $NaNO_3$ and using a machining current of 2 amperes. The wheel was rotated at 1000 rpm and the workpiece was urged against the rotating wheel at a force of 500 grams. The material removal proceeded at a rate of 30 mg/min and the workpiece had a machined surface roughness of 3 $\mu Rmax$. For comparison, it should be noted that the material-removal rate and the surface roughness with a conventional copper-electroplated wheel were 10 mg/min and 5 $\mu Rmax$, respectively.

In the subsequent purely mechanical operation wherein the machining current was cut off and the same rotating wheel continued to be in engagement, the workpiece was machined at a removal rate of 8 mg/min.

EXAMPLE III

A matrix of the same composition as in Example I was electrically sintered with the initial pressure of 10 kg/cm$^2$ continued throughout an entire period of 10 minutes of the sintering operation. The resulting wheel had a specific resistivity of 1.3 Ωcm and showed excellent machining performance similar to that in Example II.

EXAMPLE IV

The proportions of the mixture of Example I were modified to include by volume 45% TiC, 10% TiN, 30% SiC and 15% the frit. The mixture was sintered in the same manner of Example III and the resulting wheel had a specific resistivity of 2.6 Ωcm and showed similar excellent machining performance.

EXAMPLE V

A mixture containing by volume 40% TiB$_2$, 10% TiN, 30% SiC and 20% the frit was electrically sintered using an initial pressure of 10 kg/cm$^2$ and a sintering current of 3200 amperes passed over a period of 30 minutes. When the temperature reached 1200° C., a final compaction pressure of 80 kg/cm$^2$ was applied to the body for a period of 20 minutes. The resulting wheel had a specific resistivity of 2.8 Ωcm and showed excellent machining performance.

The invention also provides an improved electrode body for electrochemical grinding, consisting essentially of electrically conductive abrasive grains bonded together with an essentially electrically nonconductive bonding matrix, the abrasive grains being admixed with an amount, preferably of 10 to 25% by volume, of the bonding matrix and sintered together to form the homogeneous electrode body having a specific resistivity not greater than 100 ohm-cm, preferably between 0.1 to 10 ohm-cm. The individual electrically conductive abrasive grains may essentially consist of a substance selected from the group consisting of a carbide, nitride and/or boride of titanium and hafnium and which may be TiC, TiB$_2$, TiN, HfC, TiBC, TiCN, TiHfC, (TiB$_2$)C, (TiB$_2$)N, TiCB$_4$C, TiNB$_4$C, TiCB$_{13}$C$_2$, TiNB$_{13}$C$_2$, TiCWC, B$_4$CWC and/or B$_4$CSiC.

Thus, for example, TiC has a specific resistivity of 70 to 170 μΩcm, TiB about 40 μΩcm, TiB$_2$ 6 to 20 μΩcm, TiN 20 to 130 μΩcm, HfC 60 μΩcm, HfB$_2$ about 40 μΩcm, TiB$_2$C about 120 μΩcm, TiB$_2$N 260 μΩcm, TiCN 300 μΩcm and TiHfC 40 to 50 μΩcm. These materials have also favorable values of hardness and crushing strength. Thus, for example, TiC has a crushing strength of 2900 to 3200 kg/mm$^2$, TiB 2700 to 2800 kg/mm$^2$, TiB$_2$ 3300 to 3450 kg/mm$^2$, HfC 2500 to 3200 Kg/mm$^2$ and HfB$_2$ 2500 to 3500 kg/mm$^2$. TiN has a relatively low crushing strength of 1800 to 2100 kg/mm$^2$ and such conductive abrasive materials may be used together with hard abrasive materials of less conductivity such as B$_4$C (2400 to 3700 kg/mm$^2$), SiC (3000 to 3500 kg/mm$^2$), CBN and diamond.

The bonding matrix may be a phenolic resin, urea resin, vinylidene resin or the like resin and may also be a ceramic (glassy) or a rubber.

The porosity of the electrode body is required to provide desired chip pockets therein and should be in a range between 20 to 40%.

The particle size of the electrically conductive abrasive particles should preferably be 8000 to 500 mesh. The grain size of the electrically conductive abrasive grains formed from these particles bonded with the bonding medium such as a synthetic resin or glassy ceramic should preferably be 200 to 10 mesh. These grains may be sintered together with the bonding matrix to provide an electrode body of a porosity of 20 to 40%.

EXAMPLE VI

A mixture containing by volume 33% TiC of 10 μφ, 25% TiN of 10 μφ, 30% SiC of 7 μφ and 12% a frit was sinter-bonded and crushed to form grains of a grain size of 140 φμ. Then, a mixture containing by volume 83% the grains and 17% a frit was electrically sintered using an initial pressure of 10 kg/cm$^2$ and a sintering current of 3600 amperes applied for a period of 30 minutes. After a temperature of 1300° C. was reached, a final compaction pressure of 70 kg/cm$^2$ was applied to the body for a period of 20 minutes. The sintered body was shaped into a wheel of an outer diameter of 100 mm and a thickness of 10 mm. It was found that the wheel was homogeneous with chip pockets uniformly distributed over the entire body, had a specific resistivity of 0.5 Ωcm and showed excellent electrochemical grinding performance. The frit contained 3.8 parts Na$_2$O, 5.8 parts K$_2$O, 2.5 parts MgO, 3.5 parts CaO, 8.6 parts B$_2$O, 31.5 parts Al$_2$O$_3$, 41.9 parts SiO$_2$, 5.9 parts PbO, 3.6 parts of feldspar, 19 parts of clay, 17 parts of iron oxides and 26 parts of zinc white.

EXAMPLE VII

Using the wheel prepared in Example VI, a workpiece composed of S55C material and having a Rockwell hardness Rc65 was mechanically ground. The wheel was rotated at 1000 rpm and the workpiece was urged at a pressure of 1.5 to 2 kg/cm$^2$ against the rotating wheel while a table carrying the workpiece was fed at a rate of 0.2 mm/min. It was found that the removal rate was 8 mg/min.

EXAMPLE VIII

With the wheel prepared in Example VI, the same workpiece of Example VII was electrochemically ground using a 15% NaNO$_3$ aqueous solution and a machining current of 2 amperes. The removal rate was 30 mg/min. and the surface roughness 1.5 μRmax. There was observed no wavy formation on the machined workpiece surface.

EXAMPLE IX

A mixture containing by volume 33% TiC of 140 μφ, 20% TiN of 140 μφ, 30% SiC of 150 μφ and 17% the frit was used as a starting material of Example VI and a wheel was prepared therefrom in a similar manner described therein. Similar machining performance described in that Example was found to be obtained.

The invention also provides an improved method of electrochemically grinding an electrically conductive workpiece with a rotating wheel constituted by an electrode body as hereinbefore described. In the improved method, the workpiece is repetitively displaced transversely to the rotating wheel electrode along a straight relative path and the depth of cut in each of the successive runs repeated is set at a value not greater than 5 micrometers.

FIG. 1 shows an electrochemical grinding apparatus for performing the improved method. A worktable 1 is displaced by a feed drive 2, e.g. a hydraulic cylinder drive arrangement, in a horizontal plane. A workpiece 3 is securely mounted on the worktable 1. A rotary wheel 4 constituted favorably by an electrode body as hereinbefore described is secured on a shaft 5 rotated by a rotary drive 9. The shaft 5 is also arranged to be displaceable vertically to set a vertical position of the wheel electrode 4 relative to the workpiece 3. A vertical feed drive to this end is therefore provided although not shown. A power supply 6 is connected on one hand to the workpiece 3 via the worktable 1 and on the other hand to the wheel electrode 4 via a brush 7 to apply an electrochemical machining current between the wheel electrode 4 and the workpiece 3. The machining current is poled to make the workpiece 3 anodic and the wheel 4 cathodic and is preferably in the form of a succession of pulses. A nozzle 8 delivers a liquid electrolyte on the surface of the wheel electrode 4. As the wheel 4 rotates, the electrolyte is entrained thereon and supplied to the grinding interface formed between the wheel 4 and the workpiece 3. A control unit 10 is provided to control the feed rate of the table drive 2 so as to maintain the wattage (power) of the wheel rotary drive 9 substantially constant.

In operation, the workpiece 3 is located transversely relative to the wheel electrode 4 in a relative vertical position adjusted so as to give a depth of cut G, this being achieved by the vertical feed drive for the wheel electrode 4. Then the liquid electrolyte is supplied from the nozzle 8 to the wheel electrode 4 which is rotated by the rotary drive 9. The machining current is delivered from the power supply 6 to pass between the workpiece 3 and the rotating wheel electrode 4. Then, the worktable 1 is displaced by the horizontal feed drive 2 to bring the workpiece 3 into an electrochemical grinding relationship with the rotating wheel 4. Material removal from the workpiece 3 is produced by a combination of electrolytic solubilization caused through the electrolyte and mechanical abrading action by abrasive grains projecting from the surface of the wheel 4, possibly also due to micro-discharges which may develop uniformly throughout the electrode interface. The control unit 10 acts on the horizontal feed drive 2 to maintain the drive power of the spindle 5 driven by the rotary drive substantially constant.

Figure 2:
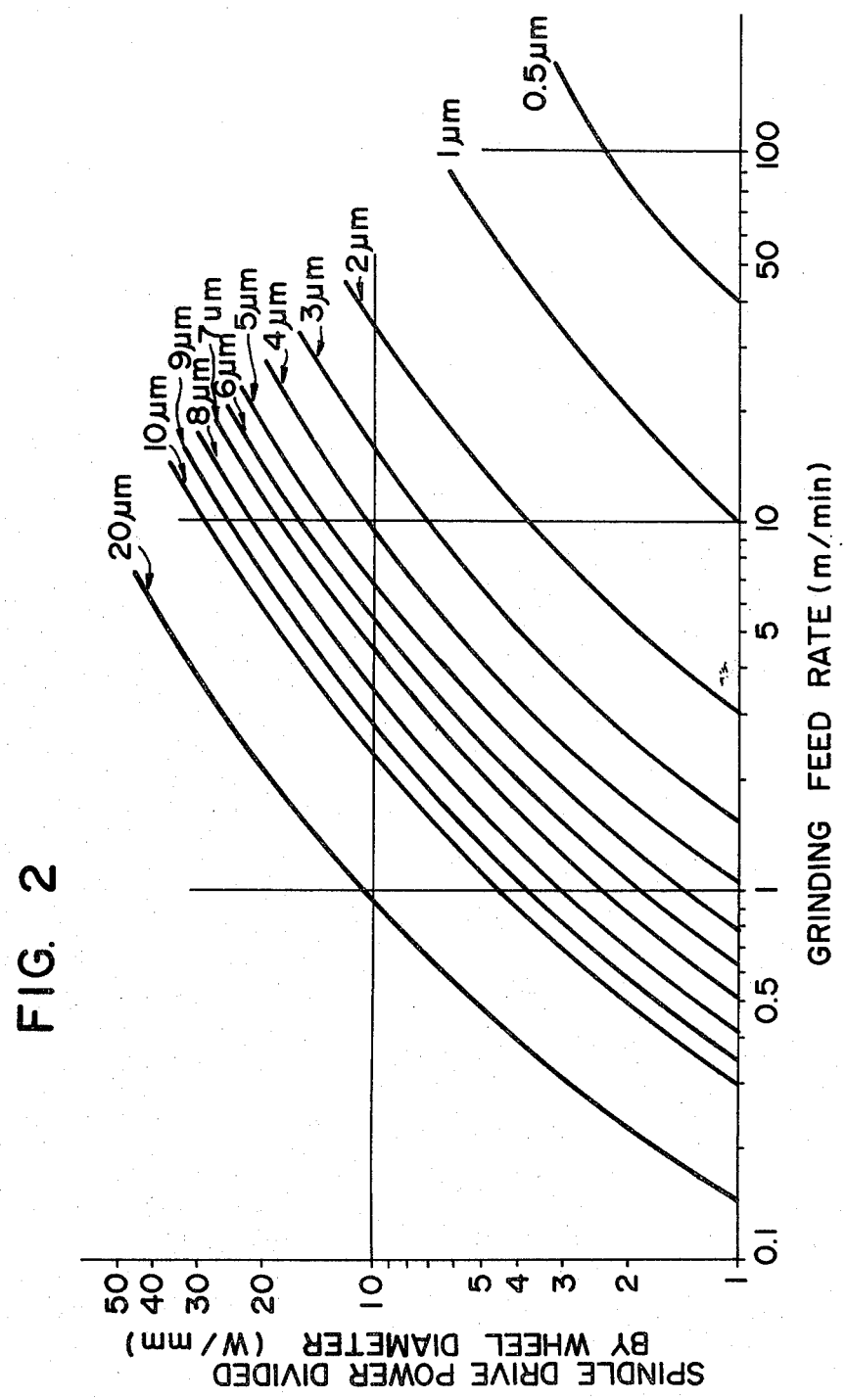
FIG. 2 is a graph illustrating how the depth of cut (grinding depth) set in each run or pass of the repeated and successive pass traverse grinding operating affects the ratio of the spindle (for wheel electrode) drive power to the wheel diameter and the grinding feed rate and their relationship which has been experimentally found as a basis of the method of the invention.

The depth of cut G effected by the rotary wheel 4 in the workpiece 3 in a single run of the horizontal displacement is set, in accordance with the present invention, to be not greater 5 microns. By limiting the cutting depth G to be this small, it is possible to minimize the spindle drive power and, hence the wattage required for the motor 9 in rotating the wheel 4. Consequently, the rate of grinding feed effected by the feed drive 2 while maintaining the spindle drive power at a predetermined minimum can markedly be enhanced. FIG. 2 shows a graph plotting the ratio of the spindle drive power to the wheel diameter along the ordinate and the grinding feed rate along the abscissa, the curves therein showing the relationship for the varying depths of cut indicated. It is seen that, for example, with the ratio being 1, a cut of depth of 1 $\mu$m yielded a grinding feed rate of 10 m/min while a cut of depth of 4 to 5 $\mu$m yielded a grinding feed rate of 1 m/min.

The increase in the feed rate means a quicker displacement of the working zone in the workpiece. As a result, the electrolytic decomposition products are carried away and replaced by a fresh electrolyte at an increased facility in the grinding interface. An extremely high concentration of ions is thus furnished and the machining current delivered at an increased density through the interface so that the electrolytic contribution to material removal is greatly augmented enough to minimize the mechanical wear of the wheel electrode. Thus, since both the increase in electrochemical material removal and the reduction in mechanical wheel wear are attained, the grinding ratio (the amount of workpiece material removal divided by the amount of wheel wear) is markedly increased.

From FIG. 2, it can be seen that there occurs a sharp reduction in the grinding feed rate when the depth of cut exceeds 5 $\mu$m. For example, with the depth of cut increased to 20 $\mu$m, it is shown that the grinding feed rate is reduced to less than 10 cm/min.

EXAMPLE X

A wheel prepared in Example I is used for electrochemically grinding an Fe/Cr/Co magnetic alloy material. The electrolyte used is an aqueous solution of 10% by weight $NaNO_3$ and the machining current is passed at a current density of 0.6 ampere/$mm^2$. The following relationship between the grinding ratio and the depth of cut is observed:

| Depth of Cut | Grinding Ratio |
| --- | --- |
| 0.5 $\mu$m | 45 |
| 1.0 | 42 |
| 3.0 | 26 |
| 5.0 | 22 |
| 10.0 | 18 |
| 25.0 | 14 |

Figure 3:
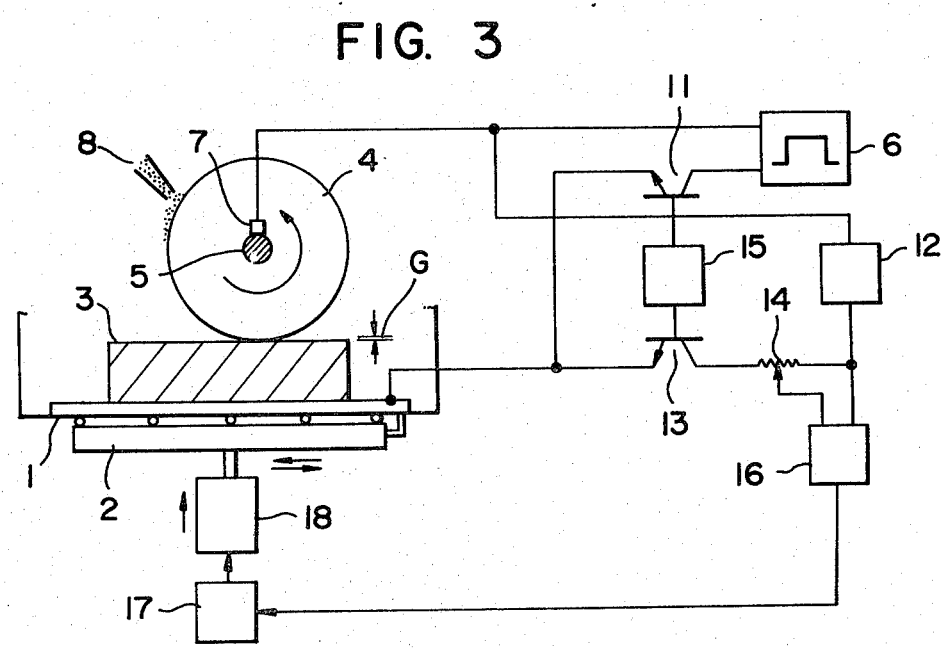
FIG. 3 is a schematic view of an electrochemical grinding arrangement including novel means for monitoring the wear of the rotating wheel electrode.

The apparatus shown in FIG. 3 in which the same numerals are used to designate the same parts or components as in FIG. 1 includes means for sensing the wear of the wheel electrode 4 to allow the workpiece 3 to be electrochemically ground and finished with a highest degree of precision. In this arrangement, the power supply 6 of DC output is connected to the workpiece 3 and the wheel electrode 4 via a switch 11 which may be a transistor or a bank of transistors to provide across the machining interface a succession of electrochemical grinding current pulses.

A monitoring power supply 12 of DC output is also connected to the workpiece 3 and the wheel electrode 4 via a switch 13 which may again be a transistor or a bank of transistors and a sensing resistor 14 connected in series. The switches 11 and 13 are turned on alternately by a common signal source 15 which may be a free-running multivibrator. Thus, only when the switch 11 is in the off state or the machining pulse is off, the switch 13 is turned on and the output of the monitoring power supply is effective across the machining interface; then a monitoring pulse is applied to the machining interface.

A discriminator circuit 16, e.g. a Schmitt-trigger circuit, is connected to the sensing resistor 14 to discriminate the sensing voltage developed thereat proportionally in magnitude to the gap resistance in the monitoring period secured by the monitoring pulse between the workpiece 3 and the wheel electrode 4. The discriminator circuit 16 has an output connected to a control circuit 17 designed to act on a vertical feed drive 18 for adjusting the vertical position of the workpiece 3 relative to the rotating wheel electrode 4.

The voltage developed at the sensing resistor 14 represents the contact resistance between the workpiece 3 and the wheel electrode 4 and hence generally the wear of the wheel electrode 4. The discriminator 16 has a predetermined threshold value preset therein. Thus, when the wear signal at the sensing resistor 14 exceeds the threshold value, the discriminator 16 is operated to furnish a control signal to the control circuit 17. The latter is then actuated to operate the vertical drive 18 to control the vertical position of the workpiece 3 relative to the wheel electrode 4 or the cutting depth G. The control circuit 17 may incorporate a counter for accumulating the output signals of the discriminator 16 which are developed in the form of pulses and may operate the vertical drive 18 when the accumulated signal pulses reach a preselected number.

There is thus provided, in accordance with the present invention, an improved electrochemical grinding electrode body as well as an improved method of and apparatus for electrochemically grinding an electrically conductive workpiece with a wheel electrode advantageously constituted by the improved electrode body.

What is claimed is:

1. An electrochemical grinding electrode body essentially consisting of electrically conductive abrasive grains bonded together with an essentially electrically nonconductive bonding matrix, said abrasive grains containing at least one substance selected from the group which consists of titanium nitride, hafnium nitride, titanium boride and hafnium boride, and being admixed with an amount of 10 to 30% by volume of said bonding matrix and sintered together to form said electrode body having a specific resistivity not greater than 100 ohm-cm.

2. The electrode body defined in claim 1 wherein said specific resistivity is not greater than 10 ohm-cm.

3. The electrode body defined in claim 2 wherein said specific resistivity is not less than 0.1 ohm-cm.

4. The electrode body defined in claim 1 wherein said at least one substance includes at least one substance selected from the group which consists of $TiB_2$, $TiN$, $TiBC$, $TiCN$, $(TiB_2)C$, $(TiB_2)N$, $TiNB_4C$, $TiCB_{13}C_2$ and $TiNB_{13}C_2$.

5. The electrode body defined in claim 1 wherein a portion of said abrasive grains is composed of at least one further substance selected from the group which consists of titanium carbide, hafnium carbide, silicon carbide and tungsten carbide.

6. The electrode body defined in claim 5 wherein said at least one further substance includes at least one substance selected from the group which consists of $TiC$, $HfC$, $TiBC$, $TiCN$, $TiHfC$, $TiCB_4C$, $WC$, $TiCWC$, $B_4CWC$, $SiC$ and $B_4CSiC$.

7. An electrochemical grinding electrode body having a porosity of 10 to 40% by volume and essentially consisting of electrically conductive abrasive grains bonded together with an essentially electrically nonconductive bonding matrix, said abrasive grains being admixed with an amount of 10 to 30% by volume of said bonding matrix and sintered together to form said electrode body having a specific resistivity not greater than 100 ohm-cm.

8. The electrode body defined in claim 7 wherein said porosity is not greater than 25% by volume.

9. An electrochemical grinding electrode body essentially consisting of electrically conductive abrasive grains bonded together with an essentially electrically nonconductive bonding matrix, said abrasive grains being admixed with an amount of 10 to 30% by volume of said bonding matrix and sintered together to form said electrode body having a specific resistivity not greater than 100 ohm-cm, said bonding matrix being of a substance selected from the group which consists of a resin, ceramic, frit and rubber.

10. An electrochemical grinding electrode body essentially consisting of electrically conductive abrasive grains bonded together with an essentially electrically nonconductive bonding matrix, said abrasive grains being admixed with an amount of 10 to 30% by volume of said bonding matrix and sintered together to form said electrode body having a specific resistivity not greater than 100 ohm-cm, said body further containing electrically nonconductive abrasive grains of a substance selected from the group consisting of diamond, boron carbides and boron nitrides.

11. The electrode body defined in claim 7, claim 8, claim 9 or claim 10 wherein said electrically conductive abrasive grains are of a grain size in the range between 10 and 200 meshes.

12. The electrode body defined in claim 11 wherein said electrically conductive abrasive grains are prepared by bonding electrically conductive abrasive particles of a particle size in the range between 500 and 8000 meshes with an essentially electrically nonconductive bonding medium.

13. The electrode body defined in claim 12 wherein said individual electrically conductive abrasive particles essentially consist of a substance selected from the group which consists of carbides, nitrides and borides of titanium and hafnium.

14. The electrode body defined in claim 12 wherein said electrically conductive abrasive particles are composed of at least one substance selected from the group which consists of $TiC$, $TiB_2$, $TiN$, $HfC$, $TiBC$, $TiCN$, $TiHfC$, $(TiB_2)C$, $(TiB_2)N$, $TiCB_4C$, $TiNB_4C$, $TiCB_{13}C_2$, $TiNB_{13}C_2$, $TiCWC$, $B_4CWC$ and $B_4CSiC$.

15. An electrochemical grinding electrode body essentially consisting of electrically conductive abrasive grains bonded together with an essentially electrically nonconductive bonding matrix, said abrasive grains being admixed with an amount of 10 to 30% by volume of said bonding matrix and sintered together to form said electrode body having a specific resistivity not greater than 100 ohm-cm, said electrically conductive abrasive grains being of a grain size in the range between 10 and 200 meshes and prepared by bonding electrically conductive abrasive particles of a particle size in the range between 500 to 8000 meshes with an essentially nonconductive bonding medium of a substance selected from the group which consists of a resin, ceramic, frit and rubber.

16. The electrode body defined in claim 7, claim 8, claim 9, claim 10 or claim 15 wherein said amount is not greater than 25% by volume.

17. The electrode body defined in claim 7, claim 8, claim 9, claim 10 or claim 15 wherein said specific resistivity is between 0.1 and 10 ohm-cm.

18. The electrode body defined in claim 7, claim 8, claim 9, claim 10 or claim 15 wherein said electrically conductive grains are composed of at least one substance selected from the group which consists of carbides, nitrides and borides of titanium and hafnium.

19. The electrode body defined in claim 17, claim 8, claim 9, claim 10 or claim 15 wherein said electrically conductive grains are composed of at least one substance selected from the group which consists of $TiC$, $TiB_2$, $TiN$, $HfC$, $TiBC$, $TiCN$, $TiHfC$, $(TiB_2)C$, (TiB$_2$)N, TiCB$_4$C, TiNB$_4$C, TiCB$_{13}$C$_2$, TiNB$_{13}$C$_2$, TiCWC, B$_4$CWC and B$_4$CSiC.

20. The electrode body defined in claim 7, claim 8, claim 9, claim 10 or claim 15, further containing electrically nonconductive abrasive grains.

21. The electrode body defined in claim 7, claim 8, claim 9, claim 10 or claim 15, further containing essentially non-abrasive electrically conductive particles.

22. The electrode body defined in claim 21 wherein said essentially non-abrasive electrically conductive particles are of a substance selected from the group which consists of a metal and carbon.

23. A method of electrochemically grinding an electrically conductive workpiece with a rotating wheel electrode constituted by an electrically conductive and abrasive electrode body wherein an electrochemical grinding current is passed between the workpiece and the rotating wheel electrode through a grinding interface flushed with a liquid electrolyte, the method comprising:
   causing the workpiece to traverse the rotating wheel electrode along a predetermined rectilinear path repeatedly and over successive runs;
   in each run, setting the depth of cut by the rotating wheel electrode in the workpiece as determined by the position of the workpiece traversing the rotating wheel electrode along said path to be not greater than 5 micrometers; and
   repeating said each run to complete said successive runs whereby to cumulatively achieve a desired depth of cut in the workpiece.

24. The method defined in claim 23 wherein said electrochemical grinding current is passed in the form of a succession of electrical pulses.

25. The method defined in claim 24, further comprising:
   applying a monitoring pulse during at least a portion of the off-time of said electrochemical grinding current pulses across said grinding interface; and
   sensing an electrical magnitude of said grinding interface resulting from said monitoring pulse, thereby determining the wear of said wheel electrode.

26. The method defined in claim 23 wherein said electrode body essentially consists of electrically conductive abrasive grains bonded together with an essentially electrically nonconductive bonding matrix, said abrasive grains being admixed with an amount of 10 to 30% by volume of said bonding matrix and sintered together to form said electrode body having a specific resistivity not greater than 100 ohm-cm.

27. An apparatus for electrochemically grinding an electrically conductive workpiece with a rotating wheel electrode constituted by an electrically conductive and abrasive electrode body including:
   a power supply for passing an electrochemical grinding current through a grinding interface defined between the workpiece and the rotating wheel electrode and flushed with a liquid electrolyte;
   drive means for causing the workpiece to traverse the rotating wheel electrode along a predetermined rectilinear path repeatedly and over a predetermined number of successive runs;
   positioning means for locating, in each of said successive runs, the position of the workpiece traversing the rotating wheel electrode along said path so as to set the depth of cut by the rotating wheel electrode in the workpiece to be not greater than 5 micrometers; and
   control means for permitting said each run to be repeated to complete said predetermined number of the successive runs whereby to cumulatively achieve a desired depth of cut in the workpiece.

28. The apparatus defined in claim 27, further comprising:
   means associated with said power supply for intermittently cutting off said electrochemical grinding current;
   an auxiliary power supply for applying across said grinding interface a monitoring pulse during at least a portion of the off-time of said electrochemical grinding current; and
   means for sensing an electrical magnitude of said grinding interface resulting from the application of said monitoring pulse, thereby determining the wear of said wheel electrode.

29. The apparatus defined in claim 28 wherein said electrode body essentially consists of electrically conductive abrasive grains bonded together with an essentially electrically nonconductive bonding matrix, said abrasive grains being admixed with an amount of 10 to 30% by volume of said bonding matrix and sintered together to form said electrode body having a specific resistivity not greater than 100 ohm-cm.

* * * * *